(12) United States Patent
Mittermair et al.

(10) Patent No.: US 9,291,248 B2
(45) Date of Patent: Mar. 22, 2016

(54) GEAR WHEEL

(75) Inventors: Mario Mittermair, Ampflwang (AT); Robert Spitaler, Bad Wimsbach/Neydharting (AT); Alexander Mueller, Altmuenster (AT); Helmut Pamminger, Voecklabruck (AT)

(73) Assignee: Miba Sinter Austria GmbH, Laakirchen (AT)

( * ) Notice: Subject to any disclaimer, the term of this patent is extended or adjusted under 35 U.S.C. 154(b) by 518 days.

(21) Appl. No.: 13/321,342

(22) PCT Filed: May 20, 2010

(86) PCT No.: PCT/AT2010/000177
§ 371 (c)(1),
(2), (4) Date: Jan. 4, 2012

(87) PCT Pub. No.: WO2010/132914
PCT Pub. Date: Nov. 25, 2010

(65) Prior Publication Data
US 2012/0132024 A1    May 31, 2012

(30) Foreign Application Priority Data

May 20, 2009   (AT) .................................. A 792/2009

(51) Int. Cl.
*F16H 55/06*   (2006.01)
*F16H 55/16*   (2006.01)
(Continued)

(52) U.S. Cl.
CPC ................ *F16H 55/06* (2013.01); *F16H 55/16* (2013.01); *F16H 55/17* (2013.01); *F16H 2055/086* (2013.01); *Y10T 74/1987* (2015.01); *Y10T 74/19679* (2015.01)

(58) Field of Classification Search
CPC ... F16H 55/06; F16H 2055/086; F16H 55/16; F16H 55/17; F16H 55/0886; F16H 55/0873
USPC ........................................ 74/457–460, 421 R
See application file for complete search history.

(56) References Cited

U.S. PATENT DOCUMENTS 1,393,886 A * 10/1921 Doty ................................ 74/460
3,173,301 A * 3/1965 Miller ............................ 474/156
(Continued)

FOREIGN PATENT DOCUMENTS

CA    1 192 765 A1   9/1985
CN    101338746 A    1/2009
(Continued)

OTHER PUBLICATIONS

International Search Report of PCT/AT2010/000177, date of mailing Sep. 14, 2010.
(Continued)

*Primary Examiner* — William Kelleher
*Assistant Examiner* — Gregory Prather
(74) *Attorney, Agent, or Firm* — Collard & Roe, P.C.

(57) ABSTRACT

The invention relates to a spur gear wheel with a gear body (4, 5) made from a sintered material, which has a circumference around which teeth (6, 7) are distributed projecting in the radial direction, and which is delimited by two end faces (8, 9, 10, 11) in the axial direction. At least one shaped element (12) in the form of a recess (13) and/or an elevation (14) and/or a compacted area is provided on at least one end face (8, 9, 10, 11) in the region of the teeth (6, 7) and/or in the radial direction underneath the teeth (6, 7).

28 Claims, 8 Drawing Sheets

(51) Int. Cl.
*F16H 55/17* (2006.01)
*F16H 55/08* (2006.01)

(56) References Cited

U.S. PATENT DOCUMENTS

| | | | | |
|---|---|---|---|---|
| 3,304,795 | A * | 2/1967 | Rouverol | 74/411 |
| 3,504,562 | A * | 4/1970 | Hirych | 474/161 |
| 3,636,792 | A * | 1/1972 | Vigh | 74/461 |
| 4,174,914 | A * | 11/1979 | Ainoura | 407/26 |
| 4,524,643 | A * | 6/1985 | Ziegler et al. | 475/345 |
| 4,651,588 | A * | 3/1987 | Rouverol | 74/462 |
| 5,356,721 | A | 10/1994 | Knoess | |
| 5,913,939 | A * | 6/1999 | Tanaka | 74/434 |
| 6,012,350 | A | 1/2000 | Mizuta et al. | |
| 6,264,567 | B1 | 7/2001 | Lyhne et al. | |
| 6,732,606 | B1 * | 5/2004 | Zhu et al. | 74/460 |
| 7,556,864 | B2 * | 7/2009 | Yamanishi et al. | 428/602 |
| 7,905,018 | B2 | 3/2011 | Ichikawa et al. | |
| 8,468,904 | B2 * | 6/2013 | Nowicki | 74/461 |
| 8,733,199 | B2 * | 5/2014 | Obayashi et al. | 74/457 |
| 2002/0170373 | A1 | 11/2002 | Kim et al. | |
| 2005/0239385 | A1 * | 10/2005 | Jankowski et al. | 451/540 |
| 2005/0279430 | A1 * | 12/2005 | Hoffman et al. | 148/586 |
| 2006/0090810 | A1 * | 5/2006 | Debaes | 139/449 |
| 2007/0125148 | A1 * | 6/2007 | Dohmann et al. | 72/352 |
| 2007/0180943 | A1 * | 8/2007 | Daout | 74/457 |
| 2007/0283778 | A1 | 12/2007 | Ichikawa et al. | |
| 2008/0152940 | A1 | 6/2008 | Kotthoff | |
| 2009/0010791 | A1 | 1/2009 | Fujiki et al. | |
| 2009/0099675 | A1 | 4/2009 | Staroselsky et al. | |
| 2009/0146650 | A1 * | 6/2009 | Hatanaka et al. | 324/207.25 |
| 2010/0178190 | A1 | 7/2010 | Colombo et al. | |
| 2012/0008985 | A1 * | 1/2012 | Park et al. | 399/167 |
| 2013/0091970 | A1 * | 4/2013 | O-oka et al. | 74/458 |

FOREIGN PATENT DOCUMENTS

| | | |
|---|---|---|
| DE | 198 15 860 | 10/1998 |
| DE | 198 52 279 | 5/2000 |
| DE | 199 58 670 A1 | 8/2000 |
| DE | 101 35 385 | 3/2002 |
| DE | 10 2005 027049 | 12/2006 |
| EP | 1 271 001 | 1/2003 |
| EP | 1 600 667 | 11/2005 |
| EP | 1 832 370 | 9/2007 |
| EP | 1832370 A1 | 9/2007 |
| EP | 1 839 780 | 10/2007 |
| EP | 2 012 014 | 1/2009 |
| RU | 2 116 532 | 7/1998 |
| WO | 2008055275 A1 | 5/2008 |
| WO | 2009033007 A2 | 3/2009 |

OTHER PUBLICATIONS

VDI-Berichte Nr. 1904, International Conference on Gears, Garching, Germany, Sep. 14-16, 2005, VDI Verlag GmbH, published 2005, ISBN 3-18-091904-3, pp. 181-196 and additional document from conference.

"P/M Gear for Passenger Car Gear Box" by Guenter Rau and Lorenz S. Sigl of Sinterstahl Fuessen GmbH at the International Conference on Gears, Sep. 14, 2005, with additional enlarged photos from presentation.

* cited by examiner

GEAR WHEEL

CROSS REFERENCE TO RELATED APPLICATIONS

This application is the National Stage of PCT/AT2010/000177 filed on May 20, 2010, which claims priority under 35 U.S.C. §119 of Austrian Application No. A 792/2009 filed on May 20, 2009. The international application under PCT article 21(2) was not published in English.

The invention relates to a spur gear wheel with a gear body made from a sintered material, with a circumference around which teeth are distributed protruding in the radial direction and which is delimited by two end faces in the axial direction, as well as a gear drive with at least two mutually meshing gears or with at least two gears which are actively connected to one another by a traction means.

The advantage which gears made from sintered materials have over gears made from solid materials is that they can also be more easily manufactured in more complex geometries and are therefore less expensive to make. For this reason, sintered gears are becoming more widely used, e.g. in modern gear systems. Naturally, however, the disadvantage which such sintered materials have over solid materials is that the individual sinter particles, in other words the sinter powder, can only be compacted to a specific density, which is normally lower than the solid density of the material, at a reasonable cost. As a result, the mechanical strength is lower than that of gears made from solid material. In order to get round this, it is common practice these days for the teeth of spur gears to be subjected to a finishing treatment, for example subsequent compaction by means of a rolling process, etc., during which the tooth crests and/or the tooth flanks and/or the tooth roots are additionally compacted, depending on the required strength. Surface treatments such as hardening, tempering, etc., are other standard methods used. In the case of subsequent mechanical compacting, the sintered gear is subjected to pressure in the radial direction.

Against the background of this prior art, the objective of the invention is to improve the contact pattern of a spur gear wheel made from a sintered material.

By contact pattern of the spur gear wheel within the meaning of the invention is meant the mechanical strength of such spur gears on the one hand and also the noise generated during operation of the spur gear wheel on the other hand.

This objective is achieved by the invention on the one hand by means of a spur gear wheel in which at least one shaped element in the form of a recess and/or an elevation and/or a compacted area is disposed on at least one end face in the region of the teeth and/or in the radial direction underneath the teeth, and by means of the above-mentioned gear drive incorporating at least one of the gears proposed by the invention.

The invention therefore relates to a special shaping of the end faces of the spur gear wheel, which are usually designed as flat faces in the case of the prior art. By special shaping within the meaning of the invention is also meant that these end faces need not necessarily have an elevation or recess, in other words these end faces may also be designed as flat faces but compacted areas are produced on these end faces which terminate flat with the rest of the end faces. However, these compacted areas proposed by the invention do not directly adjoin the root line of the toothing of the spur gear wheel but are spaced at a distance apart from it.

In the past, these end faces have not been considered as a means of increasing the mechanical strength of sintered gears in the gear processing industry because gears are normally subjected to stress in the radial or tangential direction. Surprisingly, however, it has been found that higher tooth root strengths can be obtained using the spur gears proposed by the invention. Tears normally occur in the region of the tooth root from the so-called 30° tangent. Strengthening this region results in advantages during heat treatment following the shaping of the end faces. These shaped elements are able to change the stiffness behavior of the gear body, in particular the toothing, which on the one hand improves noise, for example in the case of meshing gears, and on the other hand improves the mechanical contact pattern, in other words the mechanical strength of the gear body, especially in the region of the toothing. Similarly, improved lubrication of the spur gear wheel was observed. Also of advantage is the fact that the shaped elements can be adapted to the respective sintered material used. By using negative shapes, in other words recessed regions, in the end faces, the contact pattern can be improved because the peripheral region of the toothing may be designed so that is "softer", as a result of which the edges are able to deform more readily when subjected to load, thus making it easier to avoid jutting edges.

Based on one embodiment, the shaped element(s) extends or extend in the radial direction at most into a region underneath the root line of the teeth comprising 35% of the maximum diameter of the gear body, in other words the diameter between tooth crests lying opposite one another. This enables an improvement in the contact pattern to be obtained because the peripheral regions can be made to a softer design so that they deform more readily under load.

As an alternative, the shaped element(s) extends/extend in the radial direction at most as far as a region underneath the root line of the teeth comprising 30% of the maximum diameter of the gear body, or the shaped element(s) extends/extend in the radial direction at most as far as a region underneath des root line of the teeth comprising 25% of the maximum diameter of the gear body.

However, it should be pointed out that within the context of the invention, it would also be possible for the shaped element (s) to extend in the radial direction as far as into the hub region.

The shaped element may extend along the external contour of the end face. For example, it would therefore be possible for a single shaped element to be provided on the end face or end faces which also conforms to the external contour of the toothing. This symmetrical arrangement of the shaped element results in improvements which were observed in the contact pattern of the spur gear wheel both in the tooth crest and in the tooth root and in the tooth flank region.

In particular, it is of advantage if the shaped element extends across at least 5% of the surface portion of the teeth on the end face. Although a smaller surface portion of the shaped element on the total surface of the teeth also results in an improvement to the contact pattern, a significant increase in mechanical strength and/or a reduction in the noise level was observed with effect from a surface portion of 5%.

To this end, in some specific embodiments, the shaped element extends across at least 10% of the surface portion of the teeth on the end face or the shaped element extends across at least 30% of the surface portion of the teeth on the end face.

The shaped elements may extend inwards in the radial direction starting from at least approximately the tooth crest line, which enables better lubrication of the toothing, especially in the case of positively shaped elements, and in the case of elements based on a negative shape, in other words recesses, a further reduction in jutting edges can be achieved. Also in the case of the embodiment with the compacted areas in the region of the tooth, i.e. the side faces of the toothing, a corresponding improvement in strength was observed.

On the other hand, however, it would also be possible for the shaped elements to extend inwards in the radial direction starting from at least approximately the tooth root line, in other words either the teeth themselves do not have any shaped elements or these shaped elements are disposed underneath the tooth root line in addition to the shaped elements in the region of the end faces of the teeth. Particularly in the case of the design based on shaped elements in the form of elevations, a further improvement to the lubrication of the teeth was obtained if such shaped elements are disposed underneath the tooth root line.

Based on one embodiment, the shaped elements additionally extend on the tooth crests and/or tooth roots in the axial direction, in other words these shaped elements are continued following a change in direction in the region of the toothing, i.e. the teeth, and in this embodiment the shaped elements may be continued in the region of the teeth to the degree that shaped elements lie on oppositely lying regions of the oppositely lying end faces of the spur gear wheel and are joined to one another by the shaped elements in the tooth area. For example, by providing a recess which extends across the tooth crest and/or tooth root, starting from the end faces, the teeth can be adjusted so that they are "softer", as a result of which they are more flexible when subjected to load. This flexibility in turn enables the possibility of jutting edges to be ruled out, thereby enabling the contact pattern of the toothing overall to be improved.

Based on another embodiment, the compacted area at least in the region of the end face has a density of at least 7.2 g/cm³ in order to improve the contact pattern.

In this respect, the compacted area at least in the region of the end face may also have a density of at least 7.3 g/cm³ or at least 7.4 g/cm³.

As already mentioned, it is not absolutely necessary for the shaped elements to be elevated or recessed and instead, compacted areas may be designed so that they are level with the end face. What is achieved with this embodiment is that the flat faces may still be retained as such but an improvement can be obtained in terms of mechanical strength across the compacted areas, i.e. these shaped elements.

What also has a positive effect on the contact pattern in the case of another embodiment is if a contour of the shaped elements is provided with rounded areas at least in the region of a change in direction of the contour line of the shaped elements, in other words these shaped elements do not have any sharp-edged transitions in the region of the external contour. This, on the one hand, brings improvements in terms of the shaping of the shaped elements themselves, especially when removing the die of the pressing tool from the mold, because there is less risk of edge regions breaking off from the shaped elements, whilst on the other hand such designs proposed by the invention have proved to be of advantage during operation of the spur gear wheel.

As already mentioned, it is possible for the shaped element to have a contour which at least approximately corresponds to the contour of the tooth so that the tooth itself in turn has an improved ability to withstand load in the region of the end faces and exhibits better deformability when subjected to load, depending on the design of the shaped elements.

In the case of one variant of this embodiment, the shaped element(s) may have a mushroom-shaped cross-section in the axial direction, in which case the "mushroom head" may extend inwards in the radial direction beyond the root line, thereby bringing an improvement via the tooth roots in terms of mechanical strength and/or lubrication of the toothing.

In the case of simple embodiments, however, it is also possible for the shaped element(s) to have an approximately circular or oval cross-section as viewed in the axial direction, making shaping by the pressing process simpler, which means that the process of producing these sintered gears can be run more cost-effectively.

It is also of advantage if a transition between the shaped element(s) and the end face is of an oblique or rounded design so that there are no sharp-edged transitions between the end face and shaped element in this region either. This embodiment of the invention has proved to be of advantage during operation of spur gears in a gear drive. Furthermore, with this embodiment, an abrupt change in properties from the transition of the shaped elements into the region of the flat-designed end faces is avoided, which means that the contact pattern can be continually changed or altered to conform to a different curve, for example in the form of an exponential function, etc.

The objective of the invention is also independently achieved by a spur gear wheel in which the toothing is based on a non-uniform design. Surprisingly, it has been found that the reduction in noise can also be achieved using this type of non-uniformity. This is surprising because the teeth of a gear wheel are usually ground as accurately and uniformly as possible for the specific purpose of minimizing noise. However, tests have shown that geometrically "poor" toothing can be quieter than geometrically "good" toothing. Due to the non-uniform toothing, the energy created by the meshing of the teeth in the toothing of another gear wheel is distributed on several frequencies so that the excitation of one specific frequency is no longer as pronounced, and in particular, this reduces excitation of the harmonics of the tooth meshing frequency, so that the noise of the gear wheel is perceived as being quieter.

In order to produce non-uniformity, the tooth geometry and/or tooth strength of at least individual teeth can be influenced so that the tooth geometry and/or tooth strength of at least individual teeth differs from the tooth geometry and/or tooth strength of the remaining teeth. In particular if using sintered materials, this offers a relatively simple design of the pressing or compacting molds which is cost effective when it comes to producing non-uniform toothing. Furthermore, this offers a simple way of adapting to the desired noise behavior of the gear wheel.

However, it is also possible for at least individual ones of the tooth gap depths to be bigger or smaller than the tooth gap depths of the remaining tooth gaps, which also results in a noise reduction.

In this respect, it is of advantage if a tooth height of the teeth varies in the range of between 10% and 20% of the tooth height of the tooth with the greatest tooth height. It is in this range that the effect on frequency behavior has proved to be at its most effective.

However, it is also possible for a tooth height of the teeth to vary in the range of between 0% and 100% of the tooth height of the tooth with the greatest tooth height.

With regard to the tooth gap depths, it was found that tooth gap depths varying in the range of between 5% and 15% of the tooth gap depth of the tooth with the deepest tooth gap were of particular advantage in terms of minimizing noise.

The tooth gap depths may also vary in the range of between 0% and 100% of the tooth gap depth of the tooth with the deepest tooth gap.

In terms of the change in geometry, it is also of advantage if the tooth width in the circumferential direction varies in the range of between 50% and 100% of the tooth width of the tooth with the greatest tooth width. Again, this range has proved to be advantage as regards noise behavior.

The tooth width in the circumferential direction may also vary in the range of between 0% and 100% of the tooth width of the tooth with the greatest tooth width and preferably in the range of between 70% and 100% of the tooth width of the tooth with the greatest tooth width.

In addition to the geometrical "inaccuracy" of the toothing, it has proved to be of advantage in terms of noise reduction if the tooth stiffness of the teeth differs. In this respect, the tooth stiffness may vary in the range of between 50% and 90% of the tooth stiffness of the tooth with the highest tooth stiffness.

The tooth stiffness may also vary in the range of between 0% and 100% of the tooth stiffness of the tooth with the highest tooth stiffness.

The variance in geometry of the toothing may also be obtained by opting for a differently distributed arrangement of teeth, in other words a differing pitch around the circumference.

The tooth height of at least one tooth may vary from the end face in the direction toward the second end face, and in particular the tooth crest of the tooth may be provided with a conical aspect in the axial direction on its end face—as viewed in the radial direction. This enables the contact pattern to be varied because when the tooth meshes in the toothing of another gear, only one point or a small region begins to provide support initially. As a result, the impact which occurs on meshing in the other toothing can be reduced.

This effect of reduced meshing impact can also be achieved if the tooth width of at least one tooth varies from the end face in the direction towards the second end face, especially if the tooth flank is provided with a conical aspect in the axial direction in the region of the tooth crest.

It may also be that at least one tooth has at least one recess in at least one of its tooth flanks, in particular extending continuously from one end face to the second end face across a tooth depth in the axial direction. Although this reduces the surface available between the teeth of two sets of teeth for pressing the surfaces, a reduction in noise was observed at the transition between the pulling movement to the impacting movement. Furthermore, this embodiment of the invention has a positive effect on the lubricating film formed, especially in the case of rapidly operating gears.

The objective of the invention is also achieved independently by a spur gear wheel in which the gear body is of an at least three-layered design in the radial direction, with two peripheral layers and a middle layer, and the middle layer has a lower hardness than the two peripheral layers. The advantage of this is that load-bearing capacity is imparted by the two peripheral layers (outer layer) on the one hand and the capacity for fitting on a shaft is imparted (inner layer) on the other hand, whilst vibration damping takes place via the middle layer at the same time. This also results in a gear which reduces noise.

In this respect, it is preferable if the middle layer is made from a plastic. On the one hand, this enables a good join to be obtained between the layers. On the other hand, plastics can be readily adjusted in terms of their hardness, thereby simplifying manufacture of the gear.

The plastic is preferably a thermosetting plastic. In particular, these plastics have proved to have a positive impact in terms of durability during operation of the gear and also in terms of damping behavior.

To improve vibration damping still further, the middle layer may have a value in terms of layer thickness which is selected from a range with a lower limit of 5% and an upper limit of 700% of the layer thickness of the radially outermost peripheral layer. Below the lower limit, the middle layer exhibited only a slight improvement in damping behavior. Above the upper limit of the layer thickness, the strength of the gear decreases, thereby creating the risk of premature failure, although damping behavior is improved as such.

The value of the layer thickness may also be selected from a range with a lower limit of 10% and an upper limit of 500% of the layer thickness of the radially outermost peripheral layer and in particular from a range with a lower limit of 50% and an upper limit of 250% of the layer thickness of the radially outermost peripheral layer.

Finally, the objective of the invention is also independently achieved by means of a spur gear wheel in which the teeth have a hardness of at most 750 HV5. As a result of this special design, the meshing impact in another gear meshing with it is reduced, which in turn results in a reduction in noise.

In particular, the teeth have a hardness of at most 650 HV5 and preferably a hardness of at most 520 HV5.

In this respect, it is also of advantage if the teeth have a height whose value is selected from a range with a lower limit of 0% or 1% and an upper limit of 50% of the maximum gear diameter and/or if, based on another embodiment, the teeth have a width whose value is selected from a range with a lower limit of 1% and an upper limit of 50% of the maximum gear diameter. In addition to the "flexural softness" of the teeth, the meshing impact can also be further reduced if relatively high, slim teeth are provided on the gear.

In particular, the teeth may have a height whose value is selected from a range with a lower limit of 5% and an upper limit of 40% of the maximum gear diameter or whose value is preferably selected from a range with a lower limit of 20% and an upper limit of 30% of the maximum gear diameter.

In particular, the teeth may have a width whose value is selected from a range with a lower limit of 4% and an upper limit of 45% of the maximum gear diameter or whose value is preferably selected from a range with a lower limit of 12% and an upper limit of 29% of the maximum gear diameter.

To provide a clearer understanding, the invention will be described in more detail below with reference to the following drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIGS. 1 to 9 respectively illustrate a detail from a gear drive 1 with two mutually meshing gears 2, 3 from an oblique angle. Although not illustrated, the gear drive 1 proposed by the invention may also be a pulley drive, for example a toothed belt drive or a chain drive. In this case, there would normally be no mutually meshing gears 2, 3.

The gears 2, 3 are designed as spur gears and are made from a sintered material. For example, this sintered material might be a sintered steel SK 7201 or P-FL05M1 mod. As per the relevant standard, this sintered steel is heat-treated to 0.6% by weight C. The standard is based on a base powder with 0.85% by weight Mo.

Since the principles involved in manufacturing such gears 2, 3 by sintering are known from the prior art, for example based on the use of powder mixtures, pressing the powder, sintering and calibrating, for example, optionally with intermediate steps and a final finishing treatment for hardening purposes, etc. reference may be made to the relevant literature for any further details. The respective temperatures as well as the other process parameters depend on the sintering material used.

The gears 2, 3 respectively comprise a gear body 4, 5, which is provided with teeth 6, 7 on the circumference to form the sets of teeth. The gear bodies 4, 5 respectively have opposing end faces 8, 9 respectively 10, 11 in the axial direction. Disposed or provided on at least one of these end faces 8 to 11 of at least one gear 2,3, preferably on both end faces 8, 9 respectively 10, 11 of the two gears 2, 3, is/are (a) shaped elements 12 as proposed by the invention. In principle, these shaped elements 12 may be of a negative, neutral or positive design, in other words they may be provided in the form of recesses 13 or indentations, elevations 14 or may be level with the end faces 8 to 11 in the form of compacted zones or areas. In this respect, FIGS. 1 to 4 illustrate embodiments of the invention in which these shaped elements 12 are provided in the form of elevations 14 and FIGS. 5 to 9 illustrate embodiments of the invention in which these shaped elements 12 are provided in the form of recesses 13.

In principle, the preferred embodiments of the invention illustrated here represent but a few options for how shaped elements 12 can be provided on gears 2, 3 in the region of the end faces 8 to 11 and the invention is not restricted to the embodiments of shaped elements 12 illustrated. For example, it is also possible to opt for other shapes for these shaped elements 12 and several shaped elements 12 of different shapes may be provided on one and the same gear 2, 3, for example in the form of elevations 14 of different heights and/or recesses 13 with different depths and/or different contours and/or in the form of recesses 13 and elevations 14. Another option is for the end faces 8, 9 respectively 10, 11 of the gears 2, 3 to be provided with differently shaped elements 12, for example shaped elements 12 in the form of recesses 13 on end faces 8 and 10 and shaped elements 12 in the form of elevations 14 on end faces 9, 11.

In addition, as mentioned above, another option is for the shaped elements 12 to be provided in the form of compacted areas, in which case these compacted areas need not necessarily protrude out from the end faces 8 to 11 or be recessed into them, and instead they may be designed so that they are flat, level with these end faces 8 to 11. The design of these shaped elements 12 may be based on those illustrated in FIGS. 1 to 9 or these shaped elements 12 may also be based on any other design.

Figure 1:
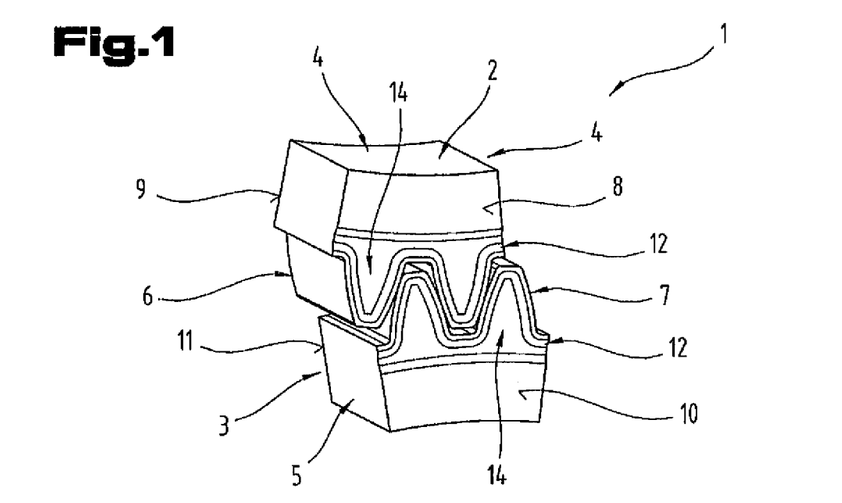
FIGS. 1 to 4 show a detail of two mutually meshing gears from a side view, where shaped elements are provided on the end faces in the form of elevations.

In the case of the embodiments illustrated in FIGS. 1 to 4, the shaped elements 12 are provided in the form of elevations 14, as already mentioned. Accordingly, FIG. 1 illustrates an embodiment in which the raised shaped element 12 on the one hand conforms to the shape of the teeth 6, 7 and then, i.e. underneath the root line of the toothing, forms an at least approximately bead-shaped web, which may extend along the entire root line. In the region of the tooth crests, tooth flanks and in the region of the root line, therefore, a land is formed on the end face 8, 10 in this embodiment, in other words the end face 8, 10 is visible in these regions.

Figure 6:
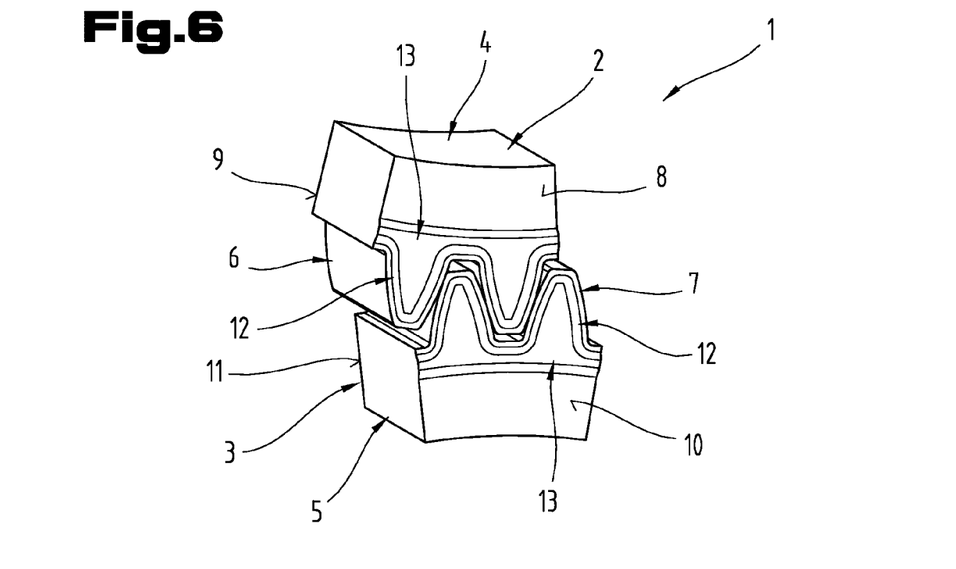

In terms of the contour of the shaped elements 12, FIG. 6 illustrates a similar embodiment of the invention, and in this instance the shaped elements 12 are provided in the form of recesses or indentations 13 with the same contour as that illustrated in FIG. 1. Again in this embodiment, therefore, a land is provided in the region of the tooth crests, tooth flanks and tooth root.

Figure 2:
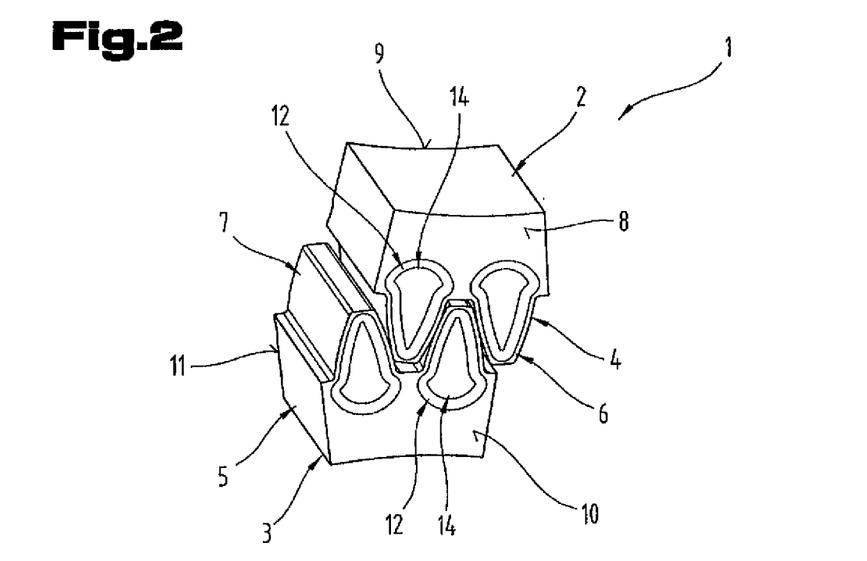

In the case of the embodiment illustrated in FIG. 2, the shaped elements 12 are at least approximately mushroom-shaped in the axial direction as seen in plan view, and again, the contour of the teeth 6, 7 is at least approximately imitated by the shaped elements 12 and a wider region is formed underneath the root line, which assumes the mushroom shape.

Figure 9:
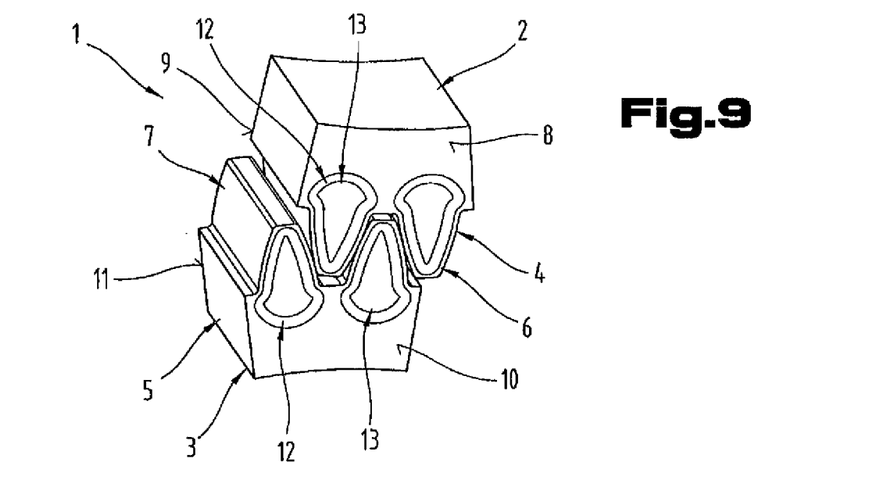

In this respect, FIG. 9 illustrates the equivalent for shaped elements 12 in the form of recesses 13 or indentations, which again are at least approximately mushroom-shaped.

Figure 3:
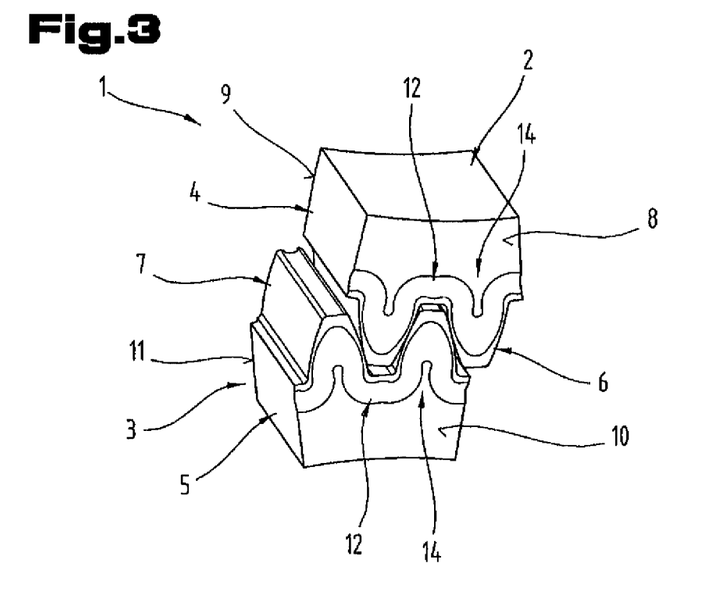

Also in the embodiment illustrated in FIG. 3, the contour of the teeth 6, 7 is imitated by the shaped elements 12, at least approximately, and these shaped elements 12 are provided in the form of bead-shaped elevations 14 above the end faces 8, 10. As illustrated, these shaped elements 12 may be provided with a larger cross-section (in the axial direction as seen in plan view) in the tooth crest region, in other words underneath the tooth crest region. Again in this embodiment, the shaped elements 12 extend along the entire toothing of the gears 2, 3.

Figure 4:
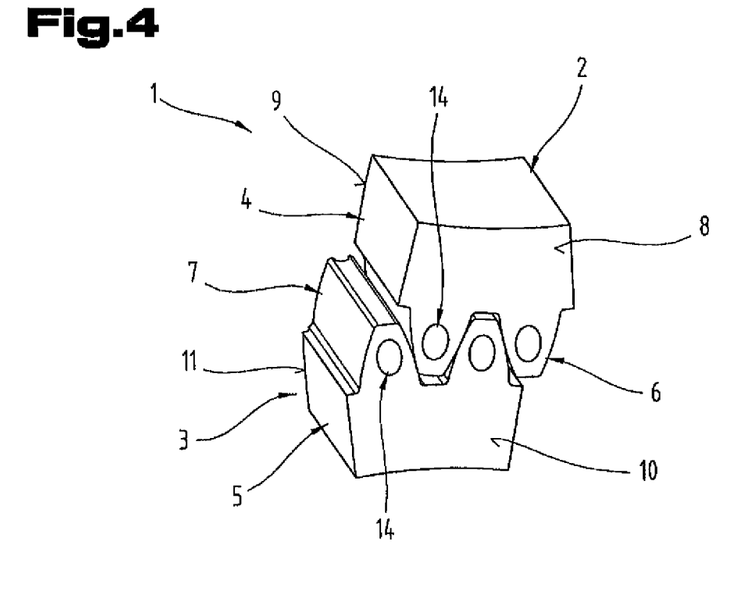
Figure 5:
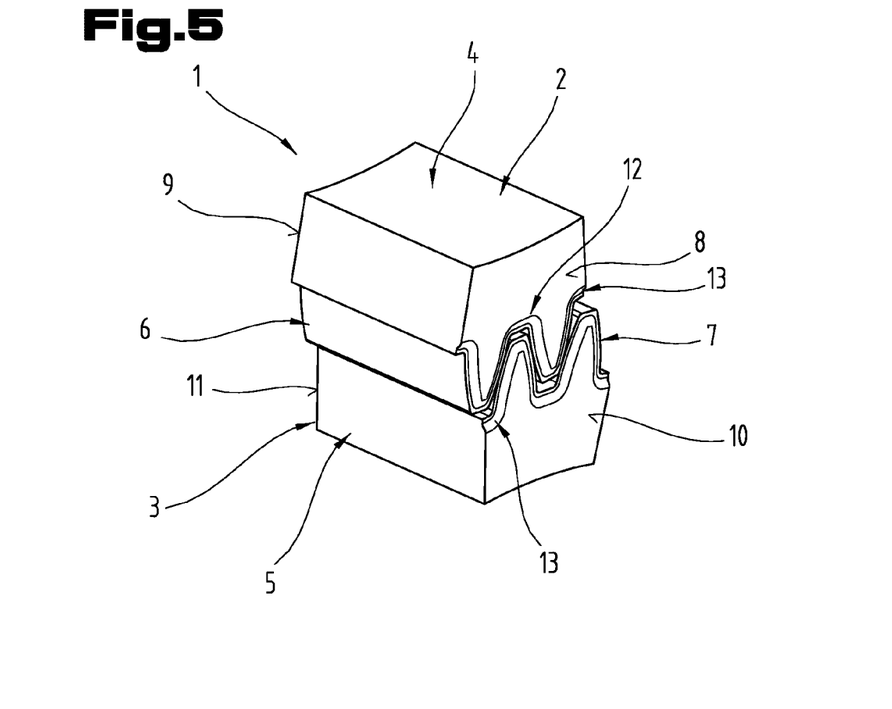
FIGS. 5 to 9 show details of two mutually meshing gears in the region of the toothing from a side view, with shaped elements based on a negative shape.

In the case of the embodiment illustrated in FIG. 4, the shaped elements 12 are again provided in the form of elevations 14 but with an at least approximately circular cross-section (in the axial direction as seen in plan view), and these shaped elements 12 may extend in the region of the root line and/or teeth 2, 3. A diameter of these shaped elements 12 is approximately 50% of the tooth thickness in the circumferential direction and the shaped elements 12 may also extend across the entire tooth width in the circumferential direction.

It should be pointed out at this stage that, within the context of the invention, it is generally possible to provide both a single shaped element 12 in the region of at least one of the end faces 8 to 11, in which case this shaped element 12 extends circumferentially around the entire toothing, or another option is for these shaped elements 12 to be disposed in discrete regions. A mixture of the two is also possible, for example where discrete shaped elements 12 are provided on the end faces 8, 10 in the region of the teeth 6, 7 and a circumferentially extending shaped element 12 is provided respectively in the region underneath the root line.

The embodiment illustrated in FIG. 5 again has shaped elements 12 in the form of recesses 13, which are disposed in the region of the teeth 6, 7 underneath the external contour of the gears 2, 3 so that these shaped elements 12 in turn conform to the contour of the toothing.

Figure 7:
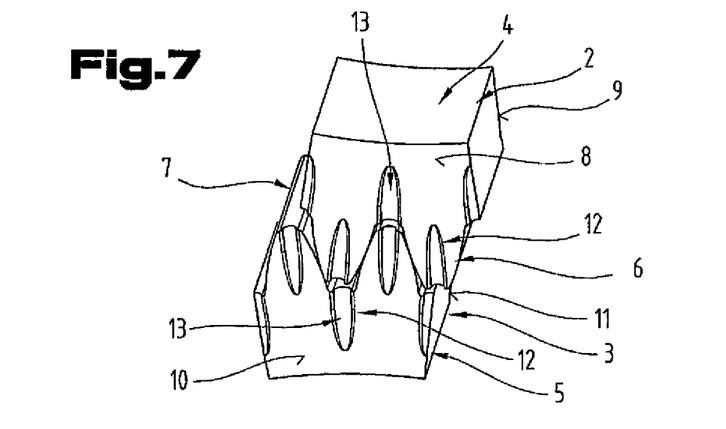

In the case of the embodiment illustrated in FIG. 7, the shaped elements 12 are provided in the form of at least approximately slot-shaped recesses or indentations 13, and these recesses 13 are provided starting at the tooth crest region and running radially inwards on the end faces 8, 10, and shaped elements 12 of this type may also be disposed in the region of the tooth roots. In this respect, it is possible for a depth of the recesses 13 to become smaller starting from the tooth crest or tooth root line extending inwards in the radial direction, in which case the shaped elements 12 always extend into the end faces 8 to 11, as illustrated in FIG. 7. A maximum clearance width of these shaped elements may represent 80% of the tooth crest width.

As an alternative to this, another option is for these shaped elements 12 to extend across the tooth roots or tooth crests in the axial direction, and in one special embodiment this may be so to the extent that two respective oppositely lying shaped elements 12 are therefore joined to one another at the end faces 8, 9 respectively 10, 11.

Figure 8:
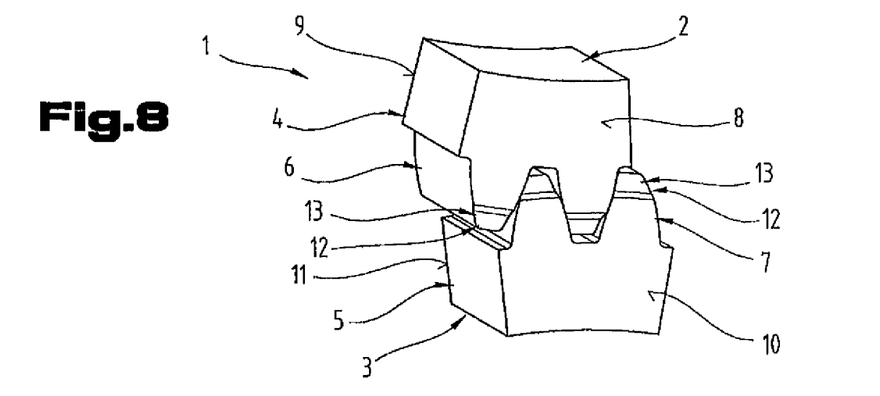

FIG. 8 illustrates an embodiment in which the shaped elements 12 are again provided in the form of recesses 13 or indentations, and in this instance the tooth crests of the teeth 6, 7 are offset from the rest of the end faces 8 to 11, in which case it is preferable to provide a ramp-shaped transition between the shaped elements 12 and end faces 8 to 11 in the form of a chamfer or rounded region. Again in this instance, it is possible for the recesses 13, i.e. the shaped elements 12, to extend across the tooth crests in the axial direction.

Generally speaking, it should be pointed out that a depth of the recess 13 is preferably within the range of between 1% and 20% of a width of the gears 2, 3 in the axial direction. On the other hand, the shaped elements 12 in the form of elevations 14 have a height relative to the end faces 8 to 11 within the range of between 1% and 20% of the width of the gears 6, 7 in the axial direction.

It is also possible for a depth of the recess 13 to correspond preferably to within the range of between 2% and 15% of a width of the gears 2, 3 in the axial direction. Alternatively, the shaped elements 12 in the form of elevations 14 have a height relative to the end faces 8 to 11 that is in the range of between 3% and 16% of the width of the gears 6, 7 in the axial direction.

It is also possible for the shaped elements to extend across at least 5% of the surface portion of the teeth on the end face.

Furthermore, it is also generally possible for a transition between the shaped elements and end faces 8 to 11 to be sharp-edged or preferably rounded or angled. A transition between individual shaped elements may likewise be based on a design of this type.

Based on one embodiment, the shaped elements 12 may also have a differing height or differing depth across their entire contour, in which case they therefore have shaped element areas which project higher above the end faces 8 to 11 or are formed deeper into the end faces 8 to 11.

In the case of shaped elements 12 in the form of compacted areas, it is preferable if these compacted areas have a density of at least 7.2 g/cm$^3$, in particular a density of at least 7.3 g/cm$^3$, at least in the region of the end face 8 to 11.

When manufacturing the gears 2, 3 proposed by the invention, in particular the shaped elements 12, the shaping preferably already takes place during the process of compacting the sinter powder. Accordingly, dies, i.e. top and bottom punches, are used, which have corresponding elevations for producing the recesses 13 and corresponding recesses for producing the elevations 14. In order to produce compacted shaped elements, one option is to press these subsequently. If these compacted areas are intended to terminate level with the end faces 8 to 11, these compacted areas can be compressed accordingly. In this respect, it is also possible for the elevations 14 to be produced separately in a first pressing step, after which these elevations 14 are compressed in a second pressing step to a degree that results in flat planar end faces 8 to 11. However, the shaped elements 12 may also be shaped after the sintering process, for example during calibration.

As a result of the design of negative shaped elements 12 based on recesses or indentations 13, the contact pattern of the gears 2, 3 can be improved due to the fact that the peripheral regions, are "softer" than the rest of the end faces 8 to 11, as is the case with the embodiments illustrated in FIG. 1 or 8 for example, in which case the edges are able to deform more readily when subjected to mechanical stress, thereby more effectively preventing jutting edges. Ruling out such jutting edges can also be achieved if, prior to sintering for example, a convexity is created on the tooth and this convexity on the tooth is created or strengthened during sintering, thereby increasing the likelihood of preventing jutting edges. In particular, it is also of advantage if a reinforcement is produced in the root line region in the region of the 30° tangent, thereby making it easier to prevent tears from occurring when the teeth 6, 7 are subjected to stress. Compacted regions can also be produced by opting for positive shapes, in other words shaped elements 12 in the form of elevations 14, which are compacted in a calibration step after the sintering process, thereby resulting in end faces 8 to 11 in the form of flat faces.

In addition to the contours and shapes of the shaped elements 12 illustrated, these might also be based on other shapes, for example oval, rectangular, cuboid, triangular, polygonal etc., in each case in the axial direction when seen in plan view.

It is also possible to provide combined shaped elements 12 on at least one of the end faces 8 to 11, for example compacted recesses or indentations 13 or compacted elevations 14. In the latter case, a correspondingly higher quantity of sinter powder must be provided during the process of shaping the gears 2, 3.

Figure 10:
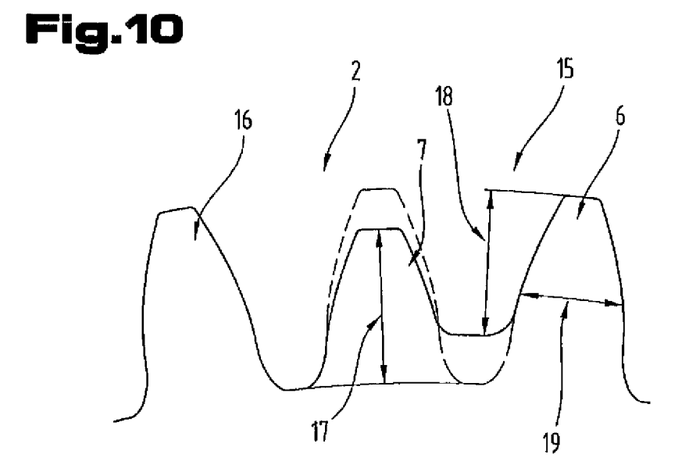
FIG. 10 is a detail showing toothing based on a different geometry of the teeth.

FIG. 10 shows a detail of toothing 15 with teeth 6, 7 and 16. As illustrated in an exaggerated manner, the toothing 15 is of a non-uniform design and these variances in geometry from what would be the "ideal" tooth shape may be used either individually or in combination with one another on the gear 2.

In the case of the variant illustrated, the tooth 16 (left-hand tooth) is based on the shape which is used as a reference for the size of the other teeth 6, 7 of the toothing 15. It is therefore the "standard shape" used for a gear known from the prior art for desired toothing. In the case of the prior art gear, the other teeth of the toothing are also of this shape.

As proposed by the invention, however, at least individual ones of the remaining teeth 5, 6 of the toothing 15 have a different geometry from this one. For example, the tooth 7 (middle tooth) has a shorter tooth height 17 as measured from the tooth crest end to the deepest point of the tooth gap between tooth 16 and tooth 7 than tooth 16. The height of the tooth 7 corresponding to tooth 16 is indicated by broken lines in FIG. 10. Tooth 6 is also of the same height as tooth 16 but a tooth gap depth 18 is shorter than the tooth gap depth between two identical teeth 16 (standard tooth). In other words, the gear 2 has several tooth root lines of differing diameter.

In addition to these geometrical variations, a tooth width 19 may also be varied, and this variation may be greater or smaller both for an identical tooth shape, measured respectively at the widest point of a tooth 6, 7, 16, and also may be varied in terms of the extension across the tooth flanks, in other words forming different tooth shapes within the toothing 15. (In FIG. 10 only one tooth shape is illustrated). Accordingly, the steepness of the tooth flanks of the teeth 6, 7, 16 may also be varied across the toothing 15.

As regards the preferred ranges for the variations, reference may be made to the explanations given above.

Another option is to vary the pitch of the toothing 15, i.e. the teeth 6, 7, 16 may be disposed at different distances from one another.

As already mentioned, these geometric variances in the teeth 6, 7, 16 with respect to one another may be used individually or in a combination of two or more or all of the options within one gear 2.

Furthermore, it is also possible, in addition or as an alternative to the geometric variations, to provide teeth 6, 7, 16 which are of a different hardness from one another within the toothing 15, and information about the hardness values may be obtained by referring to the explanations given above.

Within the meaning of the invention, therefore, the toothing 15 of a gear 2 is deliberately made to a "false" design, in other words not all the teeth 6, 7, 16 are the same. In this respect, it is not necessary for all of the teeth 6, 7, 16 to be different and instead only individual ones may be different from the other identical teeth. The layout may be selected as a function of the overall geometry of the gear or the application for which it will be used.

Figure 11:
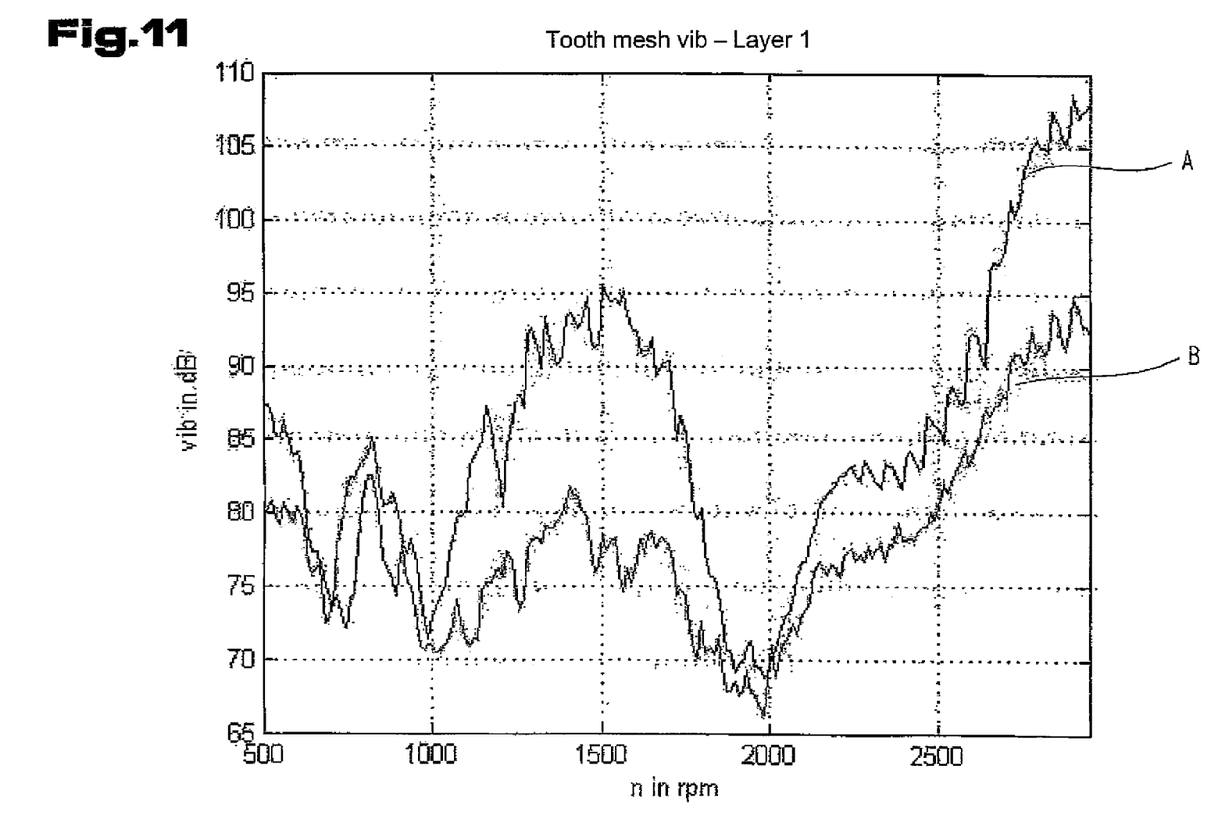
FIG. 11 is a diagram plotting the noise behavior of a gear proposed by the invention compared with a conventional gear.

FIG. 11 is a diagram illustrating the noise behavior of a gear 2 proposed by the invention as a function of the speed of rotation. Accordingly, the top curve A denotes the noise behavior of a gear based on the prior art. The bottom curve B represents a gear 2 proposed by the invention which corresponds to the gear known from the prior art with the exception of the toothing. In terms of toothing, the gear 2 proposed by the invention has teeth which differ in height in the radial direction. With the exception of a range in rotation speed of from 750 rpm to ca. 1000 rpm, the gear 2 proposed by the invention exhibits significantly less noise than the gear known from the prior art.

It is of advantage if the inaccuracy in the toothing 15 does not exhibit any periodic character, in other words a sequence of high-deep teeth 6, 7, 16 in which vibration could be generated is not provided, for example. Accordingly, the inaccuracies or geometric variations are preferably a-periodic or based on the principle or randomness, although care must be taken to ensure that meshing of the toothing 15 in another toothing is not impaired, in other words if there are several root and/or crest lines, these must match one another and are calculated using standard computer-assisted simulation methods, for example.

The tooth heights 17 may generally be varied in ranges so that there is no drop below a profile overlap of 1 as far as possible.

In the case of high teeth, it is possible for a tooth to be omitted altogether, in which case the tooth heights 17 may vary by +/−100% from the original tooth height 17. In particular, allowance must be made for the demands that will be placed on the gear 2 in terms of strength. The latter also applies to the tooth root depths.

Figure 12:
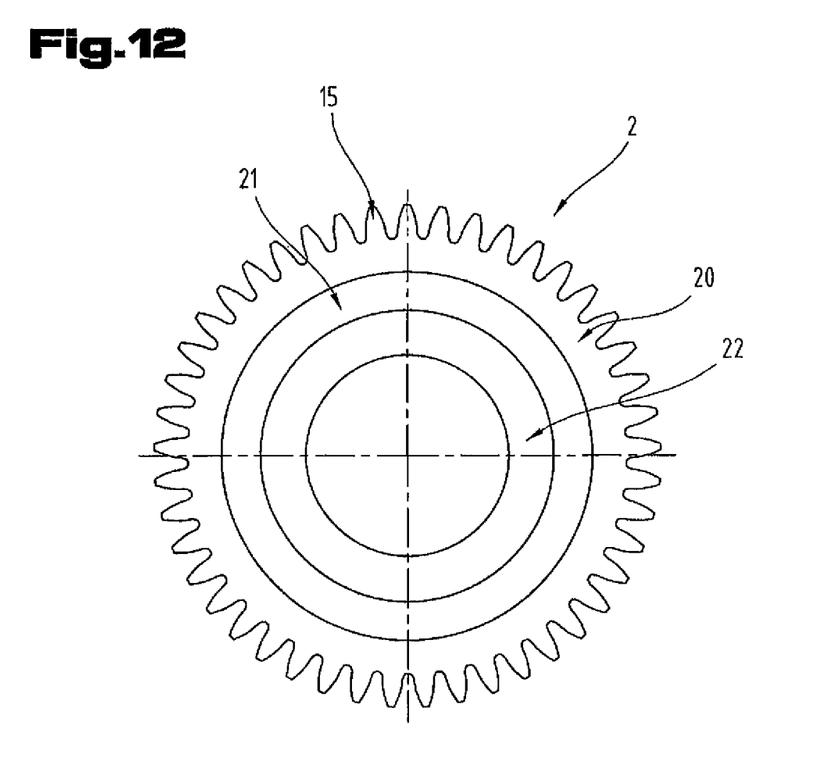
FIG. 12 shows a multi-layered gear.

FIG. 12 illustrates an embodiment of a multi-layered gear 2. This tooth edge therefore comprises an outer peripheral layer 20 or outer ring, a middle layer 21 or middle ring, and an inner peripheral layer 22 or inner ring, and the individual layers are disposed one above the other in the radial direction so that the inner peripheral layer is fitted so that it lies on a shaft, although this is not illustrated, and the outer peripheral layer incorporates the toothing 15. The two peripheral layers 20, 22 are preferably made from a sintered material.

As proposed by the invention, the middle layer 21 is made from a plastic, in particular a thermosetting plastic. In principle, however, it would also be possible for the plastic to be a thermoplastic material or an elastomer. Fluorinated plastics might be used, for example.

This middle layer has a hardness that is lower than the hardness of the two peripheral layers 20, 22, thereby enabling vibration damping to take place via this middle layer 21.

Within the context of the invention, it is also possible to provide more than three layers in the gear 2, for example four, five or more, and these other layers may have a hardness which lies between that of the middle layer 21 and the two peripheral layers 20, 22 to enable the damping behavior to be set more finely.

The layers are preferably joined to one another by means of a material and/or positive join but may also be glued to one another.

The middle layer 21 in particular has a layer thickness based on the range specified above.

Within the context of the invention, it is also to provide toothing 15 which has "flexurally soft" teeth 6, 7, 16, and by "flexurally soft" is meant a tooth stiffness of at most 20 N/(mm µm wheel width), in particular at most 10 N/(mm µm wheel width).

In addition to these teeth 6, 7, 16 being "flexurally soft", they may also be of a relatively slim and/or high design, and the values for the tooth width 19 and tooth height 17 may be selected from the ranges specified above.

This variant of the invention is particularly suitable for toothing with some play for reversing direction. Meshing impact is therefore reduced as a result.

Figure 13:
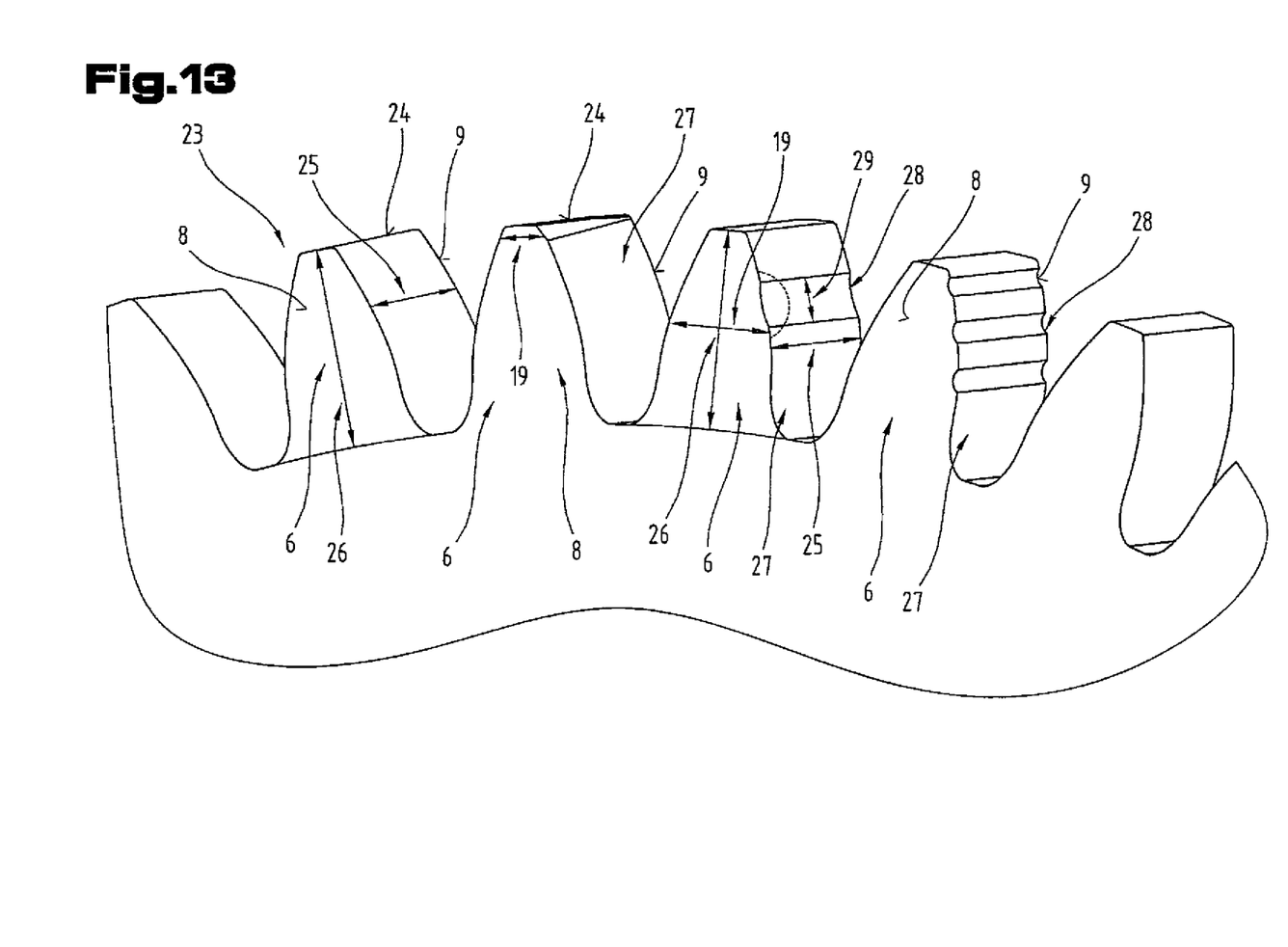
FIG. 13 is a detail showing toothing of a gear from an oblique angle, with different embodiments based on the invention.

FIG. 13 illustrates four different embodiments of teeth 6 based on the invention. However, it should be pointed out that combined variants of the embodiments illustrated and described may also be used within the context of the invention.

The first fully illustrated tooth 6 in the left-hand part of FIG. 13 has a crest narrowing on a tooth crest 23 on a radially outer end face 24, which imparts a conical aspect to the tooth crest 23. As a result of this conical aspect, the tooth 6 has a tooth depth 25 starting from the end face 8 extending in the direction towards the end face 9, in other words in the axial direction, and a decreasing tooth height 26 in the radial direction, the height of a tooth being measured from the root line. The decrease in the tooth height 26 may be in the range of between 0% and 100%, in particular between 10% and 90%, for example between 12% and 75%, of the maximum tooth height of this tooth 6.

In addition to the illustrated linear decrease in the tooth height 23, it is also possible for the latter to decrease on the basis of a different function, for example it may be provided with a rounded region. Accordingly, it is possible for the tooth height 23 to decrease in a more pronounced manner initially starting from end face 8 in the direction towards end face 9, for example, whereas in the region of end face 9, the end face 24 is flatter, i.e. has a less pronounced inclination.

Furthermore, it is also possible for at least one of the transitions of the end faces 8, 9 into the end face 24 to be provided with a chamfer or rounded region.

The tooth 6 adjoining the first completely illustrated left-hand tooth 6 in FIG. 13 also has a conical aspect, although this is not a conical aspect of the end face 24 as described above but a conical aspect in the transition area from end face 24 into tooth flank 27 adjoining it. As illustrated in FIG. 13, the transition area is of an at least approximately triangular-shaped design, although it may also be based on any other geometry. The tooth width 19 in the tooth crest region therefore varies from end face 8 in the direction towards end face 9 so that the tooth 6 is wider in this region in the specified direction and becomes slimmer in the opposite direction. The decrease in the tooth width 19 may be between 1% and 10%, in particular between 2% and 7%, for example between 3% and 6%, of the maximum tooth width in the same plane.

Although a conical aspect is provided in only the transition area end face 24—tooth flank 27 in FIG. 13—it would naturally also be possible for the second tooth flank of tooth 6 to be provided with such a decrease in the tooth width 19, in which case the two decreases may also extend in mirror image.

As a result of these embodiments, a reduction in so-called meshing impact is obtained, as already described above.

The teeth 6 adjoining the tooth 6 just described on the right-hand side in FIG. 13 have at least one recess 28 in at least one of the two tooth flanks 27, and the right-hand one of the two teeth 6 has three recesses 28 and the tooth 6 adjoining it on the left-hand side has only one recess 28, although it is wider.

Generally speaking, a width 29 of a recess 28 may be between 1% and 20%, in particular between 2% and 17%, for example between 7% and 16%, of the tooth height 26. A depth 30 of a recess 28 may be between 1% and 5%, for example between 2% and 3%, of the maximum tooth width 19 of the tooth.

It would also be possible to opt for a number of recesses 28 that is different from the number of recesses 28 illustrated in a tooth flank 27. Moreover, the recesses of a tooth 6 that are provided may have a differing depth 30 and/or width 29. The recess(es) 28 need not extend across the entire tooth depth 25 in the axial direction, as indicated by broken lines in FIG. 13. For example, the recesses 28 may extend across a region in the axial direction which is selected from a range with a lower limit of 2% and an upper limit of 10%, in particular between 3% and 8%, for example between 3% and 6%, of the total tooth depth 25 of a tooth 6 in the axial direction. Another option would be combinations extending from end face 8 into end face 9 continuously with non-continuous recesses on one or both tooth flanks 27. Such recesses 28 may also be provided on both of the tooth flanks. Furthermore, at least individual ones of the recesses 28 may be disposed extending at an angle to the axial direction.

An arrangement of this type of recesses 28 is of advantage in the case of rapidly running gears, i.e. gears with circumferential speeds in excess of 15 m/s, and with a view to creating a lubricant film and for minimizing noise, as already described above.

Another option within the context of the invention is for every tooth 6 of a toothing to be based on an embodiment of the invention corresponding to FIG. 13, and likewise it might be only every second, third, fourth, etc. tooth 6 which is based on this design. Another option is a sequence of teeth 6 provided with "irregularities" of this type in terms of shape within the meaning of the invention so that it is not regular, for example two adjacently lying teeth 6 are provided with such a variance in shape whilst a regular tooth 6 is provided adjoining them, which is then followed by only one tooth or three teeth 6 with variances in shape, etc.

It should be pointed out once again at this stage that at least individual ones of the teeth 6 within a toothing are of non-uniform designs relative to one another, i.e. in such embodiments of the invention, at least one tooth 6 is provided which is not identical to the other teeth 6 within the toothing.

The embodiments proposed by the invention may naturally be combined with one another. One gear may incorporate shaped elements 12 and/or non-uniform toothing 15 and/or the multi-layered design of a gear and/or the "flexurally soft" teeth 6, 7, 16.

The embodiments illustrated as examples represent possible variants of the gears 2, 3, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

For the sake of good order, finally, it should be pointed out that, in order to provide a clearer understanding of the structure of the gears 2, 3, they and their constituent parts are illustrated to a certain extent out of scale and/or on an enlarged scale and/or on a reduced scale.

LIST OF REFERENCE NUMBERS

1 Gear drive
2 Gear
3 Gear
4 Gear body
5 Gear body
6 Tooth
7 Tooth
8 End face
9 End face
10 End face
11 End face
12 Shaped element
13 Recess
14 Elevation
15 Toothing
16 Tooth
17 Tooth height
18 Tooth gap depth
19 Tooth width
20 Peripheral layer
21 Middle layer
22 Peripheral layer
23 Tooth crest
24 End face
25 Tooth depth
26 Tooth height
27 Tooth flank
28 Recess
29 Width
30 Depth

The invention claimed is:

1. Spur gear wheel with a gear body made from a sintered material, having a circumference around which teeth projecting in the radial direction are distributed, and which is delimited in the axial direction by two end faces, and at least one shaped element in the form of a compacted recess or a compacted elevation is disposed in or on the end faces, the compacted recess being formed in the end face or the compacted elevation projecting above the end face, wherein the at least one shaped element at least approximately imitates the contour of the toothing, wherein in the region of the tooth crests and tooth flanks and in the region of the root line a land is formed on the end face and the end face is visible in these regions in that the at least one shaped element is spaced from an outer circumference of the teeth, the at least one shaped element having a density greater than a density of the outer circumference of the teeth, wherein the at least one shaped element extends in the radial direction at most as far as a region underneath the root line of the teeth consisting of 35% of the maximum diameter of the gear body, and wherein the at least one shaped element covers at least 5% of the surface portion of the teeth on the end face.

2. Spur gear wheel according to claim 1, wherein the at least one shaped element extends along the external contour of the end face.

3. Spur gear wheel according to claim 1, wherein the at least one shaped element extends starting at least approximately from the tooth crest circle inwardly in the radial direction.

4. Spur gear wheel according to claim 3, wherein the at least one shaped element is additionally disposed extending in the axial direction on the tooth crests and/or tooth roots.

5. Spur gear wheel according to claim 1, wherein the at least one shaped element extends starting at least approximately from the tooth root line inwardly in the radial direction.

6. Spur gear wheel according to claim 1, wherein a contour of the at least one shaped element is provided with rounded areas at least in the region of a change of direction in the contour line.

7. Spur gear wheel according to claim 1, wherein the at least one shaped element has an approximately mushroom-shaped cross-section as viewed in the axial direction.

8. Spur gear wheel according to claim 1, wherein the at least one shaped element has an approximately circular or oval cross-section as viewed in the axial direction.

9. Spur gear wheel according to claim 1, wherein a transition between the at least one shaped element and the end face is of an angled or rounded design.

10. Spur gear wheel according to claim 1, wherein the toothing is of a non-uniform design and the tooth geometry and/or tooth strength of at least one of the individual ones of the teeth differs from the tooth geometry and/or tooth strength of the rest of the teeth, and wherein the non-uniformities are disposed in an a-periodic arrangement.

11. Spur gear wheel according to claim 10, wherein the tooth geometry and/or tooth strength of at least individual teeth varies from the tooth geometry and/or tooth strength of the rest of the teeth.

12. Spur gear wheel according to claim 10, wherein at least individual ones of the tooth gap depths are bigger or smaller than the tooth gap depths of the rest of the tooth gaps.

13. Spur gear wheel according to claim 10, wherein a tooth height varies in the range of between 10% and 20% of the tooth height of the tooth with the greatest tooth height.

14. Spur gear wheel according to claim 10, wherein the tooth gap depths vary in the range of between 5% and 15% of the tooth gap depth of the tooth with the deepest tooth gap.

15. Spur gear wheel according to claim 10, wherein the tooth width varies in the circumferential direction in the range of between 50% and 100% of the tooth width of the tooth with the greatest tooth width.

16. Spur gear wheel according to claim 10, wherein the tooth stiffness varies in the range of between 50% and 90% of the tooth stiffness of the tooth with the greatest tooth stiffness.

17. Spur gear wheel according to claim 10, wherein the teeth are distributed around the circumference with a differing pitch.

18. Spur gear wheel according to claim 10, wherein the tooth height of at least one tooth varies from the end face in the direction towards the second end face, in particular a tooth crest with a conical aspect is provided in the axial direction.

19. Spur gear wheel according to claim 10, wherein the tooth width of at least one tooth varies in at least certain regions from the end face in the direction towards the second end face, in particular a tooth flank is provided in the region of the tooth crest with a conical aspect in the axial direction.

20. Spur gear wheel according to claim 10, wherein the gear body comprises at least three layers in the radial direction, with two peripheral layers and a middle layer, and wherein the middle layer has a lower hardness than the two peripheral layers.

21. Spur gear wheel according to claim 20, wherein the middle layer is made from a plastic.

22. Spur gear wheel according to claim 20, wherein the plastic is a thermosetting plastic.

23. Spur gear wheel according to claim 20, wherein the middle layer has a value for the layer thickness selected from a range with a lower limit of 5% and an upper limit of 700% of the layer thickness of the radially outermost peripheral layer.

24. Spur gear wheel according to claim 20, wherein the teeth have a hardness of at most 750 HV5.

25. Spur gear wheel according to claim 24, wherein the teeth have a height whose value is selected from a range with a lower limit of 1% and an upper limit of 50% of the maximum gear diameter.

26. Spur gear wheel according to claim 24, wherein the teeth have a width whose value is selected from a range with a lower limit of 1% and an upper limit of 50% of the maximum gear diameter.

27. Spur gear wheel according to claim 1, wherein the at least one shaped element is additionally disposed on at least one of the end faces.

28. Spur gear wheel according to claim 27, wherein the compacted area has a density of at least 7.2 g/cm$^3$, at least in the region of the end face.

* * * * *